United States Patent
Yamazaki et al.

(10) Patent No.: US 10,788,346 B2
(45) Date of Patent: Sep. 29, 2020

(54) THERMAL TYPE FLOWMETER USING QUADRATIC FUNCTION OF LOGARITHM OF FLOW RATE

(71) Applicant: AZBIL CORPORATION, Chiyoda-ku (JP)

(72) Inventors: Yoshio Yamazaki, Chiyoda-ku (JP); Hidenori Hibi, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 166 days.

(21) Appl. No.: 16/130,478

(22) Filed: Sep. 13, 2018

(65) Prior Publication Data

US 2019/0086248 A1    Mar. 21, 2019

(30) Foreign Application Priority Data

Sep. 15, 2017  (JP) ................ 2017-177494

(51) Int. Cl.
*G01F 1/68* (2006.01)
*G01F 1/696* (2006.01)
*G01F 1/684* (2006.01)

(52) U.S. Cl.
CPC ............ *G01F 1/6965* (2013.01); *G01F 1/684* (2013.01); *G01F 1/6847* (2013.01)

(58) Field of Classification Search
None
See application file for complete search history.

(56) References Cited

U.S. PATENT DOCUMENTS 4,205,377 A * 5/1980 Oyama ............... F02D 41/1479
    123/480
4,255,968 A * 3/1981 Harpster ............... G01F 1/6847
    73/204.18

(Continued)

FOREIGN PATENT DOCUMENTS

| CN | 105628118 A | 6/2016 |
| JP | 2003-532099 | 10/2003 |
| JP | 2006-010322 | 1/2006 |

OTHER PUBLICATIONS

Combined Chinese Office Action and Search Report dated Mar. 4, 2020, in Patent Application No. 201811024743.7, citing document AO therein, 20 pages (with English Translation of Category of Cited Documents).

*Primary Examiner* — Harshad R Patel
(74) *Attorney, Agent, or Firm* — Oblon, McClelland, Maier & Neustadt, L.L.P.

(57) ABSTRACT

A thermal type flowmeter includes a sensor and a flow-rate calculating unit. The sensor includes a heater that heats a fluid to be measured. The sensor is configured to output a sensor value corresponding to a state of thermal diffusion in the fluid heated by the heater which is being driven in such a manner that a difference between a temperature of the heater and a temperature of the fluid at a location free from thermal influence of the heater is equal to a predetermined temperature difference. The flow-rate calculating unit is configured to calculate a flow rate of the fluid from the sensor value by using a flow-rate calculation equation, "sensor value=transformation coefficient A×log (flow rate)$^2$+transformation coefficient B×log (flow rate)+transformation coefficient C".

6 Claims, 2 Drawing Sheets

(56) References Cited

U.S. PATENT DOCUMENTS

| | | | | |
|---|---|---|---|---|
| 5,313,831 A * | 5/1994 | Beckman | ............... | G01F 1/6888 |
| | | | | 73/204.24 |
| 6,354,150 B1 * | 3/2002 | Rudent | ................. | G01F 1/6847 |
| | | | | 73/202.5 |
| 2004/0025585 A1 * | 2/2004 | Seki | ......................... | G01F 1/692 |
| | | | | 73/204.26 |
| 2013/0319105 A1 * | 12/2013 | Tanaka | ..................... | G01F 15/00 |
| | | | | 73/204.11 |
| 2019/0041248 A1 * | 2/2019 | Yamazaki | ................ | G01F 1/696 |
| 2019/0049278 A1 * | 2/2019 | Yamazaki | .............. | G01F 1/6847 |

* cited by examiner

THERMAL TYPE FLOWMETER USING QUADRATIC FUNCTION OF LOGARITHM OF FLOW RATE

CROSS-REFERENCE TO RELATED APPLICATIONS

The present application is based on and claims priority to Japanese Application No. 2017-177494, filed Sep. 15, 2017, the entire contents of which are incorporated herein by reference.

BACKGROUND

1. Field

The present disclosure relates to a thermal type flowmeter that measures the flow rate of a fluid using the effect of thermal diffusion in the fluid.

2. Description of the Related Art

Techniques that measure the flow rate or velocity of a fluid flowing through a flow path are in widespread use, for example, in the industrial and medical fields. Examples of various devices that measure the flow rate or velocity include electromagnetic flowmeters, vortex flowmeters, Coriolis type flowmeters, and thermal type flowmeters, and different ones are used for different purposes. The thermal type flowmeters are advantageous in that they are capable of detecting gases, basically free from pressure loss, and capable of measuring mass flow rates. Thermal type flowmeters that are capable of measuring the flow rate of a corrosive liquid, with a glass tube thereof serving as a flow path, are also used (see, e.g., Japanese Unexamined Patent Application Publication No. 2006-010322, Japanese Unexamined Patent Application Publication (Translation of PCT Application) No. 2003-532099). Thermal type flowmeters that measure the flow rate of a liquid, as described above, are suitable for use in measuring a very small amount of flow.

The thermal type flowmeters are of two different types: one uses a method that measures the flow rate from a difference in temperature between the upstream and downstream sides of the heater, whereas the other uses a method that measures the flow rate from power consumption of the heater. For example, the heater is driven in such a manner that it is heated to a temperature consistently 10° C. higher than water temperature. Then, the flow rate is calculated from a difference in temperature between the upstream and downstream sides of the heater, or from the power consumption of the heater.

As described above, the thermal type flowmeter calculates a flow rate from a sensor value, such as the temperature difference between the upstream and downstream sides of the heater or the power consumption of the heater, measured by a sensor. It is known that in a simple form, the correlation between the sensor value and the flow rate can be expressed by the following equation (1) and can be represented by a curve, such as that shown in FIG. 5:

$$P = (A + B\sqrt{u})\Delta T \quad (1)$$

where P is a sensor value, A and B are constants that are determined by shape, thermal conductivity, density, viscosity, specific heat, or the like, $\mu$ is a flow rate, and $\Delta T$ is the heating temperature of the heater relative to a liquid temperature.

In thermal type flowmeters actually used, however, the constants A and B in equation (1) cannot be uniquely determined due to variations among products. Moreover, in practice, depending on the flow velocity distribution, ambient temperature, or the like, the correlation between the sensor value and the flow rate exhibits characteristics that cannot be fully expressed by equation (1). Accordingly, it is necessary for each product to actually flow a fluid, acquire a sensor value corresponding to an actual flow rate value, and determine in advance the correlation between the actual flow rate and the sensor value (constants A and B).

Since the correlation between the sensor value and the flow rate is represented by a curve, such as that shown in FIG. 5, determining the constants in advance requires many adjustment points each representing a relation between the actual flow rate value and the sensor value. This means that it takes time to determine in advance the correlation between the sensor value of the thermal type flowmeter and the actual flow rate.

SUMMARY

The present disclosure has been made to solve the problem described above. An object of the present disclosure is to determine the correlation between the sensor value of the thermal type flowmeter and the actual flow rate in a short time.

A thermal type flowmeter according to an aspect of the present disclosure includes a sensor and a flow-rate calculating unit. The sensor includes a heater that heats a fluid to be measured. The sensor is configured to output a sensor value corresponding to a state of thermal diffusion in the fluid heated by the heater which is being driven in such a manner that a difference between a temperature of the heater and a temperature of the fluid at a location free from thermal influence of the heater is equal to a predetermined temperature difference. The flow-rate calculating unit is configured to calculate a flow rate of the fluid from the sensor value by using a flow-rate calculation equation, "sensor value=transformation coefficient A×log (flow rate)$^2$+transformation coefficient B×log (flow rate)+transformation coefficient C".

In the thermal type flowmeter described above, the sensor may output power of the heater as the sensor value when the heater is being driven in such a manner that the difference between the temperature of the heater and the temperature of the fluid at a location free from thermal influence of the heater is constant.

In the thermal type flowmeter described above, the sensor may output a temperature difference between a temperature of the fluid upstream of the heater and a temperature of the fluid downstream of the heater as the sensor value when the heater is being driven in such a manner that the difference between the temperature of the heater and the temperature of the fluid at a location free from thermal influence of the heater is equal to the predetermined temperature difference.

The thermal type flowmeter described above may further include a tube configured to convey the fluid, and a temperature measuring unit disposed in contact with an outer wall of the tube and configured to measure the temperature of the fluid. The heater may be disposed in contact with the outer wall of the tube.

As described above, in the aspect of the present disclosure, the flow rate of the fluid is calculated from the sensor value by using the flow-rate calculation equation, "sensor value=transformation coefficient A×log (flow rate)$^2$+transformation coefficient B×log (flow rate)+transformation coefficient C". The correlation between the sensor value of the thermal type flowmeter and the actual flow rate can thus be determined in a short time.

DETAILED DESCRIPTION

Figure 1:
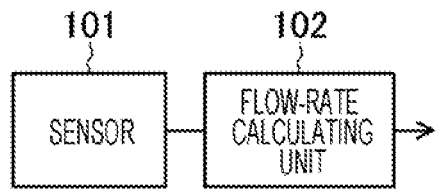
FIG. 1 is a block diagram illustrating a configuration of a thermal type flowmeter according to an embodiment of the present disclosure.

A thermal type flowmeter according to an embodiment of the present disclosure will now be described with reference to FIG. 1. The thermal type flowmeter includes a sensor 101 and a flow-rate calculating unit 102.

The sensor 101 includes a heater that heats a fluid to be measured (which may hereinafter be referred to as "measured fluid"). The sensor 101 outputs a sensor value corresponding to the state of thermal diffusion in the fluid heated by the heater which is being driven in such a manner that the difference between the temperature of the heater and the temperature of the fluid at a location free from thermal influence of the heater is equal to a predetermined temperature difference.

The flow-rate calculating unit 102 calculates the flow rate of the fluid from the sensor value by using a flow-rate calculation equation, "sensor value=transformation coefficient A×log (flow rate)$^2$+transformation coefficient B×log (flow rate)+transformation coefficient C".

Figure 2:
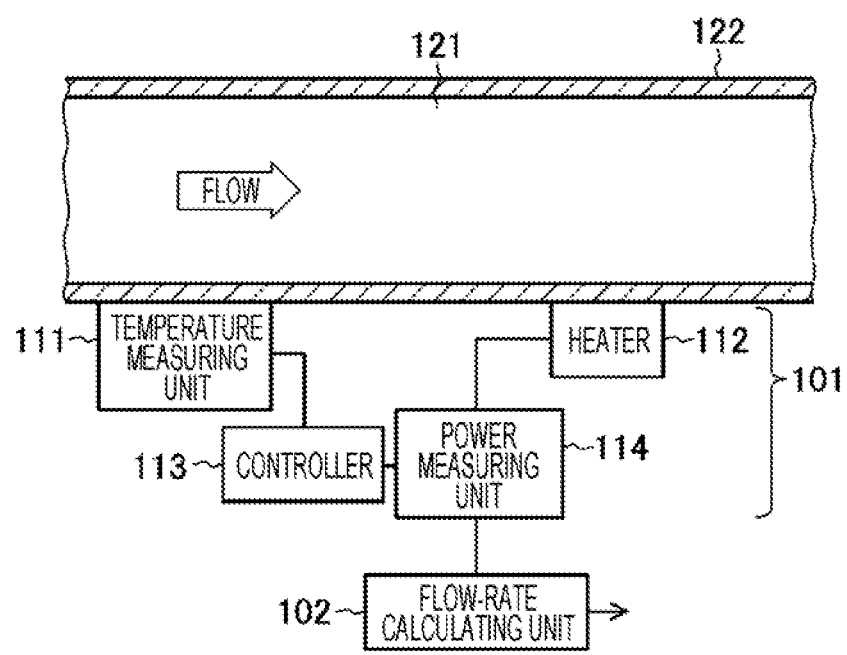
FIG. 2 is a block diagram illustrating in detail a configuration of a sensor in the thermal type flowmeter according to the embodiment of the present disclosure.

The sensor 101 will now be described in detail. For example, as illustrated in FIG. 2, the sensor 101 includes a temperature measuring unit 111, a heater 112, a controller 113, and a power measuring unit 114. The temperature measuring unit 111 is disposed in contact with the outer wall of a tube 122 that conveys a measured fluid 121. For example, the tube 122 is made of glass. The heater 112 is disposed in contact with the outer wall of the tube 122 on the downstream side of the temperature measuring unit 111. The temperature measuring unit 111 measures the temperature of the fluid 121.

The controller 113 controls and drives the heater 112 in such a manner that the difference between the temperature of the heater 112 and the temperature of the fluid 121 measured by the temperature measuring unit 111 at a location free from thermal influence of the heater 112 (e.g., at a location upstream of the heater 112) is equal to a predetermined temperature difference. The power measuring unit 114 measures and outputs the power of the heater 112 controlled by the controller 113. In this example, the power output from the power measuring unit 114 of the sensor 101 is the sensor value. From the power of the heater 112 (i.e., sensor value) measured and output by the power measuring unit 114, the flow rate of the fluid 121 can be calculated.

As is well known, power consumed by the heater 112 has a correlation with the flow rate of the fluid 121 when the heater 112 is being driven in such a manner that the difference between the temperature of the heater 112 and the temperature of the fluid 121 at a location free from thermal influence of the heater 112 is equal to a predetermined temperature difference. This correlation is reproducible with the same fluid and under the same flow rate and temperature conditions. Therefore, from the power of the heater 112 measured by the power measuring unit 114 when the heater 112 is being controlled by the controller 113 as described above, the flow rate of the fluid 121 can be calculated by using a predetermined correlation coefficient.

Figure 3:
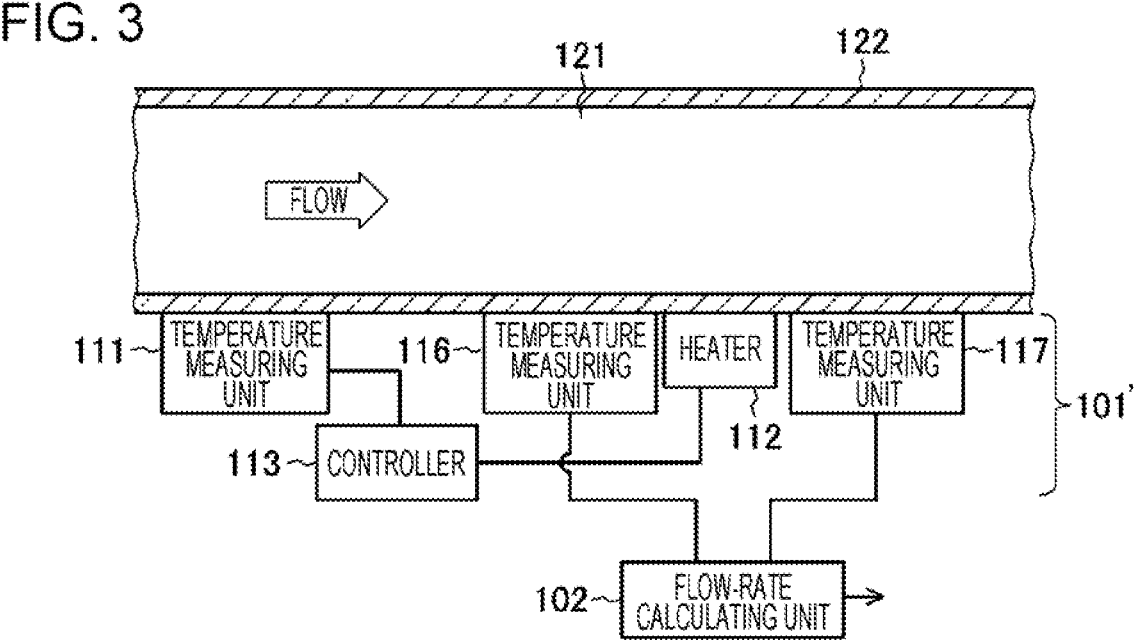
FIG. 3 is a block diagram illustrating in detail another configuration of the sensor in the thermal type flowmeter according to the embodiment of the present disclosure.

A sensor 101' illustrated in FIG. 3 may be used, instead of the sensor 101 described above. The sensor 101' includes the temperature measuring unit 111, the heater 112, the controller 113, a temperature measuring unit 116, and a temperature measuring unit 117.

The temperature measuring unit 111 is disposed in contact with the outer wall of the tube 122 that conveys the measured fluid 121. The heater 112 is disposed in contact with the outer wall of the tube 122 on the downstream side of the temperature measuring unit 111. The temperature measuring unit 111 measures the temperature of the fluid 121.

The controller 113 controls and drives the heater 112 in such a manner that the difference between the temperature of the heater 112 and the temperature of the fluid 121 measured by the temperature measuring unit 111 at a location free from thermal influence of the heater 112 (e.g., at a location upstream of the heater 112) is equal to a predetermined temperature difference.

The temperature measuring unit 116 is disposed in contact with the outer wall of the tube 122 on the downstream side of the temperature measuring unit 111 and the upstream side of the heater 112. The temperature measuring unit 117 is disposed in contact with the outer wall of the tube 122 on the downstream side of the heater 112. The temperature measuring unit 116 and the temperature measuring unit 117 both measure the temperature of the fluid 121.

The flow rate of the fluid 121 can be calculated from the difference between the fluid temperature measured by the temperature measuring unit 116 and the fluid temperature measured by the temperature measuring unit 117. In this example, the temperature difference between the fluid temperature measured by the temperature measuring unit 116 and the fluid temperature measured by the temperature measuring unit 117 is the sensor value.

As is well known, the temperature difference between the temperature of the fluid 121 upstream of the heater 112 and the temperature of the fluid 121 downstream of the heater 112 has a correlation with the flow rate of the fluid 121 when the heater 112 is being driven in such a manner that the difference between the temperature of the heater 112 and the temperature of the fluid 121 at a location free from thermal influence of the heater 112 is equal to a predetermined temperature difference. This correlation is reproducible with the same fluid and under the same flow rate and temperature conditions. Therefore, from the difference (temperature difference) between the temperature measured by the temperature measuring unit 116 and the temperature measured by the temperature measuring unit 117 when the heater 112 is being controlled by the controller 113 as described above, the flow rate of the fluid 121 can be calculated by using a predetermined correlation coefficient.

Figure 5:
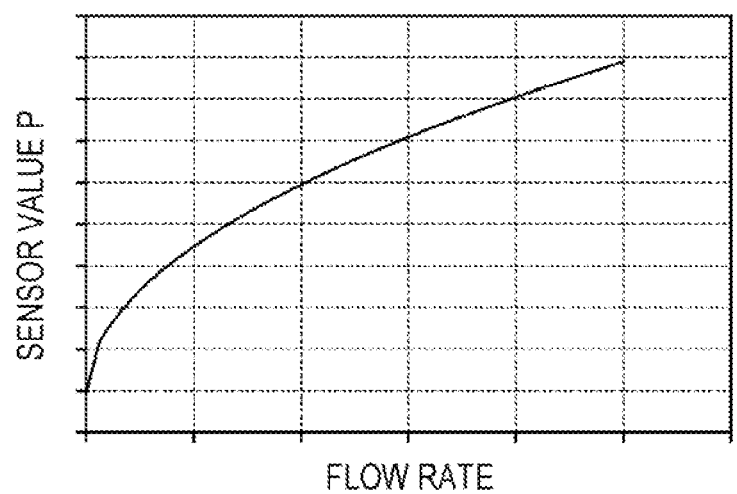
FIG. 5 is a characteristic diagram showing a correlation between the sensor value of the thermal type flowmeter and the flow rate.

The correlation between the actual flow rate and the sensor value of the thermal type flowmeter is represented by a curve, as described with reference to FIG. 5. A logarithmic axis into which this curve is transformed is substantially straight. In other words, equation (1) can be approximated to a substantially straight line by logarithmic transformation. By using the relation represented by the approximate straight line, constants in the relation equation can be determined without requiring many adjustment points. However, it was found that due to the influence of flow velocity distribution or the like, accurate transformation cannot made by linear approximation in practice.

Studies done by the present inventors have discovered, however, that by the following quadratic equation, the correlation between the actual flow rate and the sensor value of the thermal type flowmeter can be approximated over the entire range of flow rates:

$$P = A \times \log(u)^2 + B \times \log(u) + C \qquad (2)$$

where P is a sensor value, A, B, and C are transformation coefficients, and $\mu$ is a flow rate.

Note that the transformation coefficient A, the transformation coefficient B, and the transformation coefficient C can be determined in advance from three simultaneous equations obtained by acquiring first, second, and third sensor values through measurement of three different flow rates, first, second, and third flow rates, of the measured fluid, and substituting the first, second, and third flow rates and the first, second, and third sensor values into equation (2), which is a flow-rate calculation equation. As described above, in the present embodiment, which does not require many adjustment points, the correlation between the sensor value of the thermal type flowmeter and the actual flow rate can be determined in a short time.

In determining the transformation coefficient A, the transformation coefficient B, and the transformation coefficient C, it is desirable that the first flow rate, the second flow rate, and the third flow rate be logarithmically equally spaced. For example, it is desirable that the first flow rate, the second flow rate, and the third flow rate be 1 (g/min), 6 (g/min), and 36 (g/min), respectively.

Figure 4:
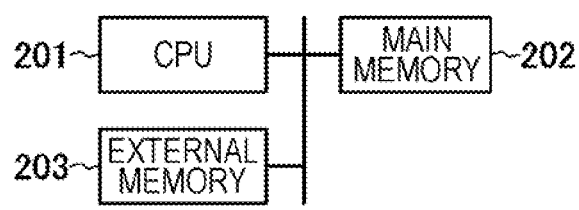
FIG. 4 is a block diagram illustrating a hardware configuration of a flow-rate calculating unit according to the embodiment of the present disclosure.

The flow-rate calculating unit 102 is a computer device that includes, as illustrated in FIG. 4, a central processing unit (CPU) 201, a main memory 202, and an external memory 203. The functions described above are implemented when the CPU 201 operates in accordance with a program expanded in the main memory 202.

As described above, in the embodiments of the present disclosure, the flow rate of the fluid is calculated from the sensor value by using the flow-rate calculation equation, "sensor value=transformation coefficient A×log (flow rate)$^2$+transformation coefficient B×log (flow rate)+transformation coefficient C". This makes it possible to determine the correlation between the sensor value of the thermal type flowmeter and the actual flow rate in a short time.

The present disclosure is not limited to the embodiments described above. It is obvious that, within the technical idea of the present disclosure, various modifications and combinations can be made by those having ordinary knowledge in the art.

What is claimed is:

1. A thermal type flowmeter, comprising:
a sensor including a heater that heats a fluid to be measured, the sensor being configured to output a sensor value corresponding to a state of thermal diffusion in the fluid heated by the heater, which is being driven in such a manner that a difference between a temperature of the heater and a temperature of the fluid at a location free from thermal influence of the heater is equal to a predetermined temperature difference; and
processing circuitry configured to calculate a flow rate of the fluid from the sensor value by using a flow-rate calculation equation, in which the sensor value=transformation coefficient A×log (flow rate)$^2$+ transformation coefficient B×log (flow rate)+transformation coefficient C.

2. The thermal type flowmeter according to claim 1, wherein the sensor outputs a power of the heater as the sensor value, the heater being driven in such a manner that the difference between the temperature of the heater and the temperature of the fluid at a location free from thermal influence of the heater is constant.

3. The thermal type flowmeter according to claim 1, wherein the sensor outputs a temperature difference between a temperature of the fluid upstream of the heater and a temperature of the fluid downstream of the heater as the sensor value, the heater being driven in such a manner that the difference between the temperature of the heater and the temperature of the fluid at a location free from thermal influence of the heater is equal to the predetermined temperature difference.

4. The thermal type flowmeter according to claim 1, further comprising:
a tube configured to convey the fluid; and
a temperature measuring sensor disposed in contact with an outer wall of the tube, the temperature measuring sensor being configured to measure the temperature of the fluid,
wherein the heater is disposed in contact with the outer wall of the tube.

5. A method comprising:
Receiving, from a sensor including a heater that heats a fluid to be measured, a sensor value corresponding to a state of thermal diffusion in the fluid heated by the heater, which is being driven in such a manner that a difference between a temperature of the heater and a temperature of the fluid at a location free from thermal influence of the heater is equal to a predetermined temperature difference; and
calculating a flow rate of the fluid from the sensor value by using a flow-rate calculation equation, in which the sensor value=transformation coefficient A×log (flow rate)$^2$+transformation coefficient B×log (flow rate)+ transformation coefficient C.

6. A thermal type flowmeter, comprising:
a sensor including a heater that heats a fluid to be measured, the sensor being configured to output a sensor value corresponding to a state of thermal diffusion in the fluid heated by the heater, which is being driven in such a manner that a difference between a temperature of the heater and a temperature of the fluid at a location free from thermal influence of the heater is equal to a predetermined temperature difference; and
processing circuitry configured to calculate a flow rate of the fluid from the sensor value by using a flow-rate calculation equation in which the sensor value is a quadratic function of the logarithm of the flow rate.

* * * * *